(12) United States Patent
Gabrys

(10) Patent No.: US 7,902,700 B1
(45) Date of Patent: Mar. 8, 2011

(54) LOW HARMONIC LOSS BRUSHLESS MOTOR

(76) Inventor: Christopher W. Gabrys, Reno, NV (US)

( * ) Notice: Subject to any disclaimer, the term of this patent is extended or adjusted under 35 U.S.C. 154(b) by 616 days.

(21) Appl. No.: 11/732,330

(22) Filed: Apr. 3, 2007

Related U.S. Application Data

(60) Provisional application No. 60/789,214, filed on Apr. 3, 2006.

(51) Int. Cl.
*H02K 21/12* (2006.01)

(52) U.S. Cl. ............... 310/68 R; 310/156.83; 310/86

(58) Field of Classification Search ............ 310/156.23, 310/27–29, 31, 266, 86, 156.36, 156.37, 310/156.74, 156.75, 156.76, 156.77, 156.83, 310/112–114
See application file for complete search history.

(56) References Cited

U.S. PATENT DOCUMENTS

| | | | | |
|---|---|---|---|---|
| 3,845,338 A | * | 10/1974 | Fawzy | 310/46 |
| 3,904,898 A | * | 9/1975 | Mailfert | 104/290 |
| 4,933,581 A | * | 6/1990 | Shramo | 310/86 |
| 5,311,092 A | * | 5/1994 | Fisher | 310/266 |
| 5,744,896 A | | 4/1998 | Kessinger, Jr. | 310/268 |
| 5,801,470 A | * | 9/1998 | Johnson et al. | 310/156.27 |
| 6,323,575 B1 | | 11/2001 | Devenyi | 310/266 |
| 6,710,489 B1 | * | 3/2004 | Gabrys | 310/90.5 |
| 6,794,776 B1 | * | 9/2004 | Gabrys | 310/74 |
| 6,828,710 B1 | * | 12/2004 | Gabrys | 310/179 |
| 6,876,114 B2 | | 4/2005 | Knotts et al. | 310/156 |
| 6,891,302 B1 | * | 5/2005 | Gabrys | 310/178 |
| 7,141,903 B2 | | 11/2006 | Keene et al. | 310/85 |
| 2004/0041409 A1 | * | 3/2004 | Gabrys | 290/55 |

* cited by examiner

*Primary Examiner* — Quyen Leung
*Assistant Examiner* — Naishadh N Desai
(74) *Attorney, Agent, or Firm* — J. Michael Neary

(57) ABSTRACT

A brushless permanent magnet motor has a rotor supported to rotate about an axis of rotation, and a stator that is stationary and magnetically exerts torque upon the rotor. The rotor has a ferromagnetic backiron and a circumferential array of alternating polarity magnetic poles that drive magnetic flux back and forth across an armature airgap. The stator includes an air core armature with windings made of bundled multiple individually insulated strand conductor wire. The windings are assembled together in a non-ferromagnetic structure that is located in the armature airgap, so alternating magnetic flux from the alternating polarity magnetic poles passes through the windings as the rotor rotates. A thin electrically conducting shield is located inside the armature airgap to increase the efficiency of the motor by reducing eddy current losses in the surfaces of the rotor magnets.

20 Claims, 3 Drawing Sheets

LOW HARMONIC LOSS BRUSHLESS MOTOR

This application claims the benefit of U.S. Provisional Application No. 60/789,214, filed Apr. 3, 2006

This invention pertains to motors for converting between electrical and mechanical energy and more particularly to a brushless permanent magnet motor for providing increased efficiency.

BACKGROUND OF THE INVENTION

There is a desire for high efficiency motors that minimize operating electricity costs, especially in high duty cycle and or high power applications. Unfortunately, most motors in widespread use have less than optimal efficiency and suffer from a number of losses including resistive, eddy current and hysteresis. One motor construction that can be utilized to reduce these losses is an air core construction. In this configuration, the windings are not wound into slots in a lamination stack but instead are wound in a non-magnetic structure, which is located directly in the magnetic airgap. Although increased efficiency can be achieved with air core motors over conventional motors, further increased efficiencies would be desirable, especially for motors that are driven from modern variable speed electronic drives.

SUMMARY OF THE INVENTION

The invention provides a brushless permanent magnet motor that affords increased efficiency and energy savings. The motor comprises a rotor that rotates about an axis of rotation, and a stator that magnetically exerts torque upon the rotor. The rotor is constructed of a ferromagnetic backiron and a circumferential array of alternating polarity magnetic poles that drive magnetic flux back and forth across an armature airgap in which the stator is mounted. The stator includes an air core armature with windings that are comprised of bundled multiple individually insulated conductor wire, assembled together in a substantially non-ferromagnetic supporting structure. Alternating magnetic flux from the alternating polarity magnetic poles passes through the windings as the rotor rotates, and that flux interacts with flux generated by synchronous current in the armature windings to produce torque on the rotor.

The motor further comprises a thin non-ferromagnetic and electrically conducting shield located inside the magnetic airgap adjacent to the air core armature surface. The shield reduces the magnetic losses incurred in the rotor from a ripple current in the windings. Air core armature electrical machines have large magnetic air gaps, and they typically utilize greater volumes of magnets to drive magnetic flux across the armature airgap. This airgap can be 10 or higher times greater than slot wound armature electrical machines. Because of the large airgap, the windings are located further from magnets or ferromagnetic structure; therefore harmonic losses in these types of machines would be unexpected. They have no slot teeth, which is a usual cause of harmonic losses in conventional motors. However, because of the reduced inductance of air core armature motors, up to 1000 times lower than a conventional motor, coupling to a pulse width modulated drive inverter results in higher ripple current. It has been found that some losses, although small, do occur in the rotor resulting from the high frequency ripple current in air core motors.

The shield causes eddy currents to flow in the shield from the switching ripple current in the armature windings. This ripple current is the result of pulse modulation to control the current and commutation of the motor when driven by a variable speed drive. Although contrary to intuition that having these currents flow in the shield is undesirable, in fact they are desirable. The eddy currents in the shield cause losses to occur in the shield. However, without the conducting shield, these eddy currents would flow in the magnets or ferromagnetic structures adjacent the air core armature. The benefit of the shield is that it shields the underlying magnets or ferromagnetic structures. The total harmonic losses in the rotor are actually reduced because the eddy currents become preferably mostly confined in the shield and do not deeply penetrate the higher resistivity magnets or ferromagnetic structure, causing higher losses.

Unlike a conventional slot wound motor that requires a very thin magnetic airgap to operate efficiently and cannot easily employ a shield, the air core motor has a large airgap with adequate space to employ the shield. Additionally, a higher pulse modulation switching frequency, on the order of about 5 kHz to 50 kHz, is used to operate a low inductance air core motor. This higher switching and harmonic frequency, which would otherwise cause higher harmonic losses, can instead be advantageously utilized by the invention. The greater the switching frequency, the lower the skin depth thickness of the shield conducting material. As a result, the high frequency switching of the drive inverter with the air core motor substantially reduces the required thickness of the conducting shield. This makes it even easier to implement.

The conducting shields can be located on both sides of the armature or just one side, with less benefit. Likewise, the shields can be located on either the rotor surfaces or surprisingly can be located on the stator. When located on the stator, the shields are exposed to both the harmonics and also to the synchronous current, which is much higher and drives the rotor. However, because the switching frequency for the low inductance is much higher, as much as 83 times higher or more, such as 20,000 Hz and 240 Hz, the thin thickness needed for the harmonics to be reduced, is not appreciably affected by the synchronous low frequency to cause unwanted losses.

In one embodiment of the invention, the shield has a thickness that is greater than ⅓ the skin depth thickness for the shield material and the ripple current frequency. In another embodiment, the windings are driven by a pulse modulated synchronous inverter with a ripple current having a frequency that is greater than 5 kHz. For axial gap motors, the shield can be constructed as a simple flat sheet. For radial gap motors, the shield can be constructed by rolling a conducting sheet into a tube. Other constructions are also possible depending on the required thickness for the operating frequency and parameters.

In a further embodiment of the invention, magnetic induced losses can be minimized by constructing the rotor from two spaced apart ferromagnetic rotor portions defining an armature airgap therebetween. The circumferential arrays of alternating polarity magnetic poles drive flux back and forth across the armature airgap. The air core armature is located in the armature airgap. In this construction, a rotating magnetic flux field passes through a ferromagnetic structure that rotates with the flux field, allowing for maximum efficiency. Again, the conducting shields can be located either on the rotor surfaces or alternated on each side of the air core armature.

DESCRIPTION OF THE DRAWINGS

The invention and its many advantages and features will become better understood upon reading the following detailed description of the preferred embodiments in conjunction with the following drawings, wherein.

DESCRIPTION OF THE PREFERRED EMBODIMENTS

Figure 1:
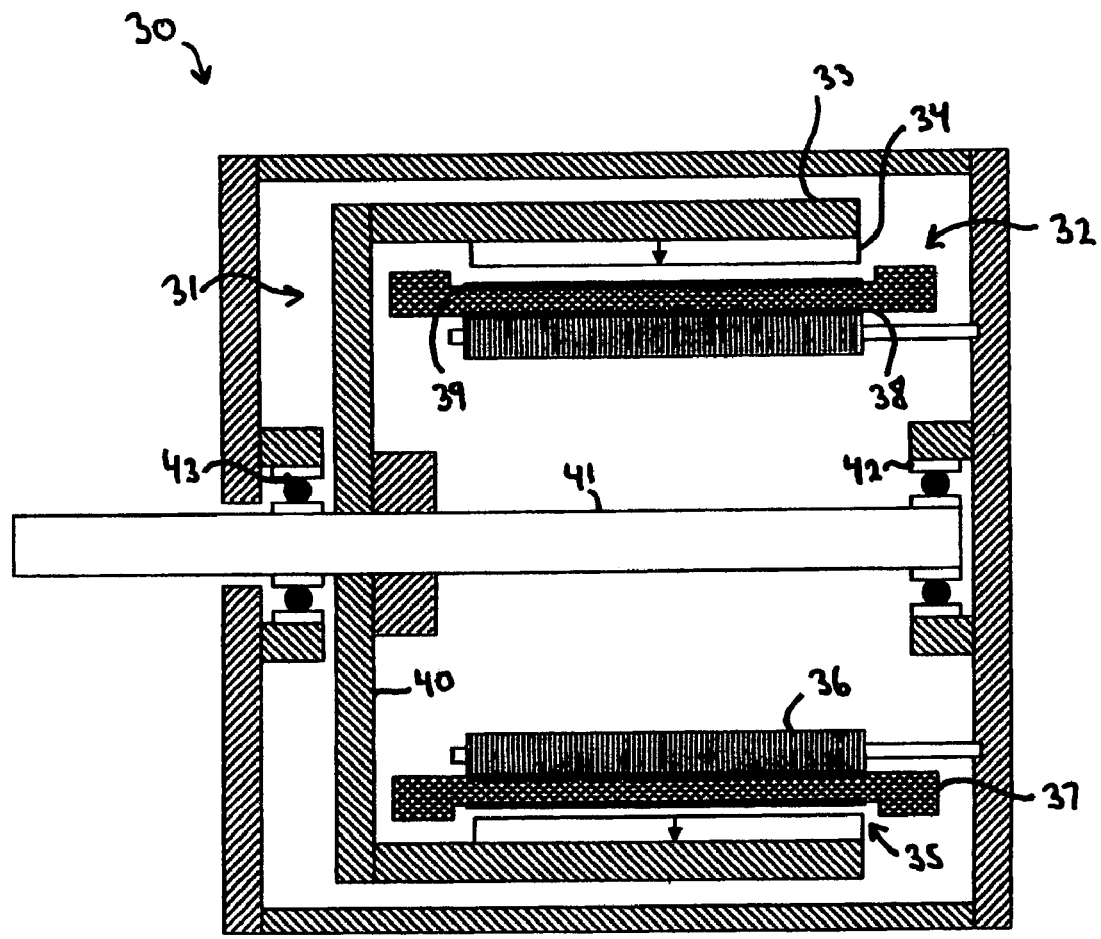
FIG. 1 is a schematic drawing of a brushless motor in accordance with the invention.

Turning to the drawing, wherein like reference characters designate identical or corresponding parts, FIG. 1 shows a brushless motor in accordance with the invention. The motor 30 is constructed of a ferromagnetic backiron 33 and a circumferential array of alternating polarity magnetic poles 34 that drives magnetic flux back and forth across an armature airgap 35. The stator 32 is constructed of an air core armature 37 that is comprised of bundled multiple individually insulated strand conductor wire. The strands could be fine round conductors, as in Litz wire, or they could be rectangular or ribbon wire designed and oriented edge-wise to the flux direction to prevent any significant eddy current losses in the windings. Solid conductor wire could also be used, but with some efficiency penalty due to eddy current losses in the windings induced from the adjacent rotating magnetic poles. These windings are assembled together in a substantially non-ferromagnetic structure that is located in the armature airgap 35.

In the motor configuration shown, the stator further comprises a stationary inner backiron 36 comprised of a lamination stack. The stationary backiron 36 bounds the other side of the magnetic airgap 35 and its' low loss construction mitigates magnetically induced losses from the rotating flux distribution passing through a stationary ferromagnetic structure. Both the inner and outer backirons 36, 33 conduct circumferentially traveling magnetic flux that links circumferentially adjacent magnetic poles 34.

The motor further comprises a thin non-ferromagnetic and electrically conducting shield to increase the motor efficiency. The purpose of the shield is to reduce harmonic or magnetically induced losses in the rotor caused by the high frequency ripple current from the low inductance armature windings being driven from a pulse modulated inverter. As shown, the motor 30 utilizes two shields 38, 39. The shields 38, 39 are located inside the armature airgap 35 adjacent to the surfaces of the air core armature 37. The shields 38, 39 are preferably constructed from copper or aluminum having a high electrical conductivity and magnetic permeability resulting in a reduced skin depth thickness. The depth that eddy currents penetrate into a material is affected by the frequency of the excitation current and the electrical conductivity and magnetic permeability of the material. The depth at which eddy current density has decreased to 1/e, or about 37% of the surface density, is called the standard depth of penetration or skin depth thickness (d). Although eddy currents penetrate deeper than one standard depth of penetration, they decrease rapidly with depth. At two standard depths of penetration (2d), eddy current density has decreased to 1/e squared or 13.5% of the surface density. At three depths (3d) the eddy current density is down to only 5% of the surface density. Copper has a skin depth thickness of less that is about ⅓ less than that of aluminum so it is significantly more preferable.

A reduced skin depth thickness allows for the ripple currents to be more effectively shielded from the rotor magnets and ferromagnetic structure adjacent the airgap with a thinner layer. For example, with a 20 kHz PWM ripple current, the skin depth thickness of a copper shield is approximately 18 mils, whereas an aluminum shield would be 33 mils. In a preferred embodiment, the shield has a thickness that is greater than ¹⁄₁₀, and preferably greater than ⅓ the skin depth thickness for the shield material and the ripple current frequency. In air core motors of the invention, the ripple current preferably has a frequency that is greater than 5 kHz. This allows for reduced ripple currents from the coupling of the motor drive to the very low inductance armature windings and for a shield that is easily implemented. As shown, the shields 38, 39 are both stationary and are attached to the air core armature 37. The rotor backiron 33 is connected to a central shaft 41 through a hub 40. The shaft 41 is journalled for rotation by bearings 42, 43.

Figure 2:
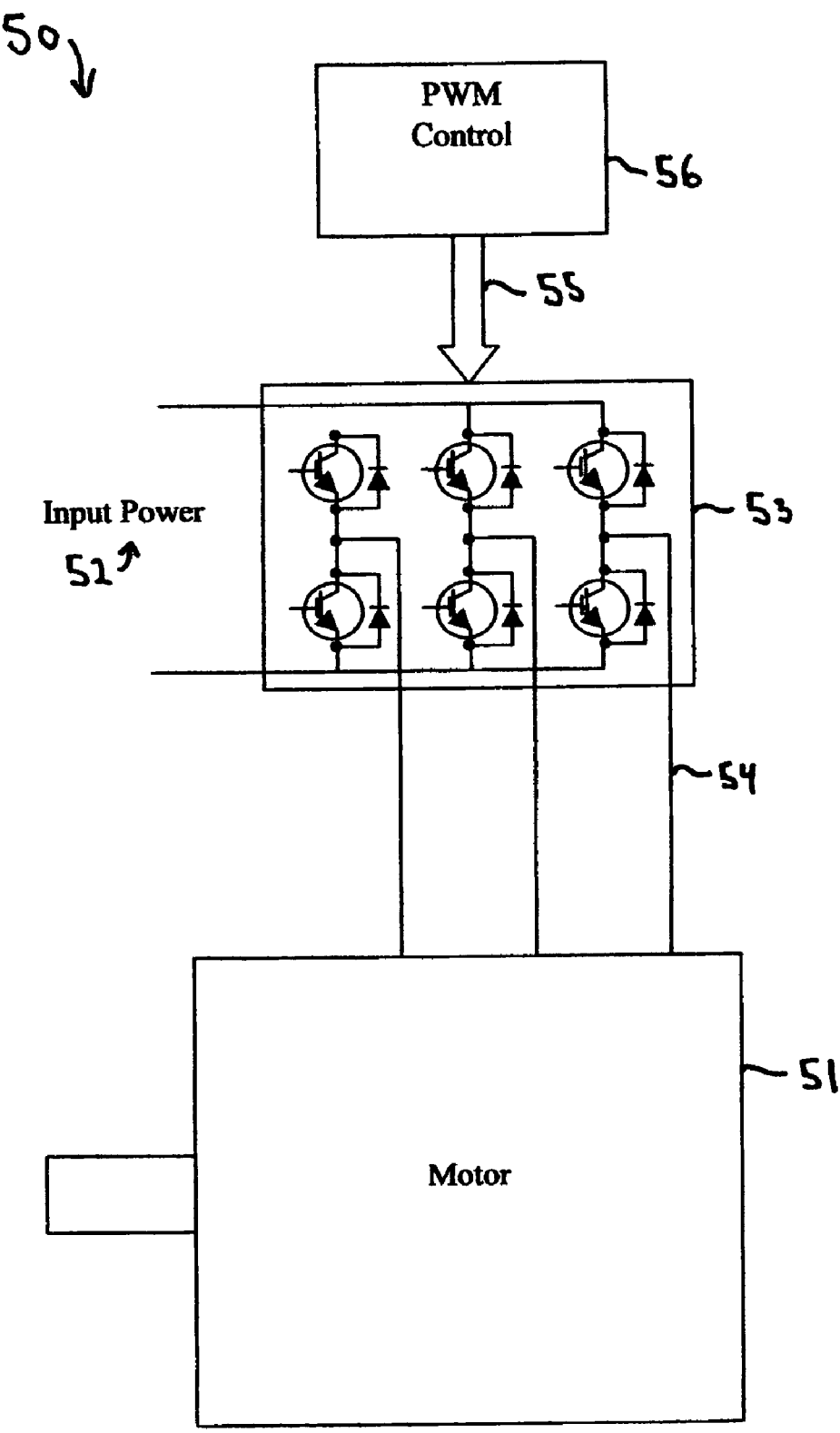
FIG. 2 is a schematic drawing of a brushless motor and electronic drive in accordance with the invention.

A brushless motor and electronic drive in accordance with the invention is shown in FIG. 2. The drive system 50 drives a brushless air core motor 51 from input power 52. A pulse width modulated inverter bridge 53 converts the input power 52 to 3-phase synchronous power 54 that accelerates and drives the motor 51. A control board 56 provides commutation and current control signals 55 to the inverter bridge 53 to generate the regulated and synchronous motor power 54. The motor power 54 drives the armature windings in the motor 51.

Figure 3:
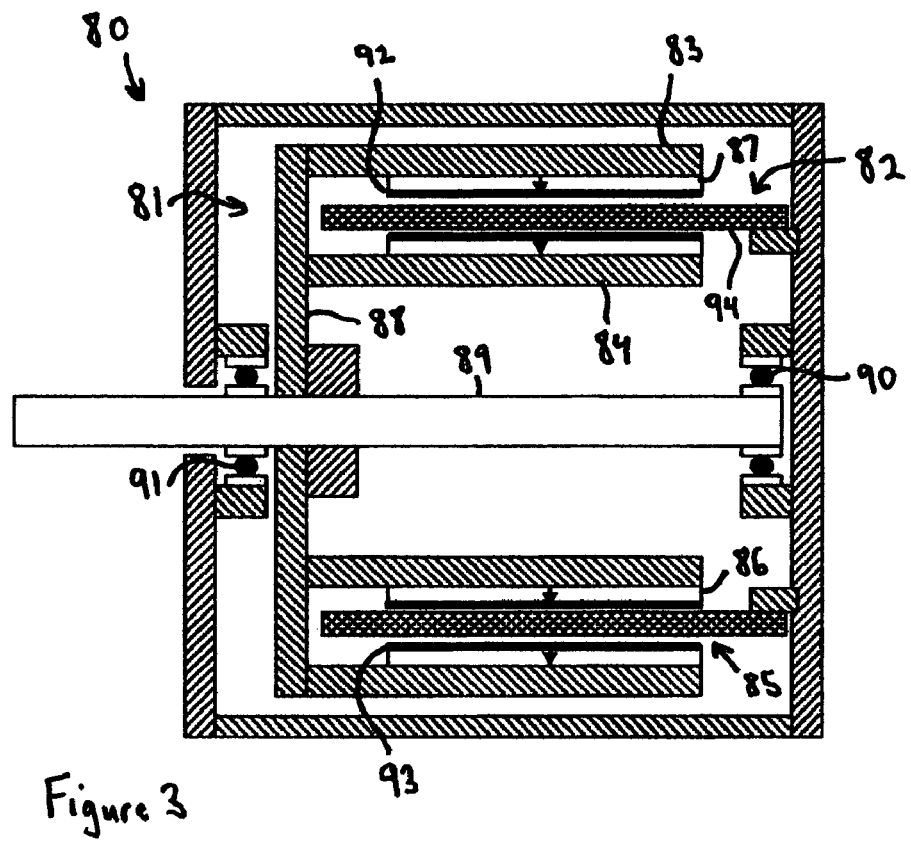
FIG. 3 is a schematic drawing of an alternate configuration brushless motor in accordance with the invention.

An alternate configuration brushless motor in accordance with the invention is shown in FIG. 3. The motor 80 is comprised of a rotor 81 and a stator 82. The rotor 81 is constructed from two spaced apart ferromagnetic rotor portions 83, 84 that result in an armature airgap 85 therebetween. One or both rotors can have the permanent magnets for flux generation. As shown, each rotor portion 83, 84 have circumferential arrays of alternating polarity magnetic poles 86, 87 that drive magnetic flux back and forth across the armature airgap 107, while the rotor portions 83, 84 serve as backirons that provide a low reluctance flux path for flux flowing circumferentially between circumferentially adjacent magnets to complete the flux loops. The stator is constructed of an air core armature 94 with windings comprised of bundled multiple individually insulated strand conductor wire. The windings are assembled together in a substantially non-magnetic structure that is located in the armature airgap 85, whereby alternating magnetic flux from the poles 86, 87 passes through the windings as the rotor 81 rotates. The ferromagnetic rotor portions 83, 84 are attached to a central shaft 89 through a hub 88. The shaft 89 is journalled for rotation by bearings 90, 91. The motor 80 further includes thin non-magnetic and electrically conducting shields 92, 93 located inside the armature airgap 85 that reduce the magnetic losses incurred in the rotor 81 when the motor 80 is coupled to a variable speed drive. The shields 92, 93 are attached to the surfaces of the magnets 86, 87 and shield them from eddy current losses from high frequency pulse modulation ripple. Since the shields are stationary with respect to the magnet array, they are not subjected to varying flux from the magnets, so no eddy current losses are created by varying flux from that source. Therefore, the shields need not be thin to minimize eddy current losses from that source, but it is nevertheless desirable to minimize shield thickness to achieve a small air gap. For this reason, the same thickness range of ⅓ to three times the skin depth thickness for the shield material and the ripple current frequency in the motor for which the shield is designed is preferred.

Figure 4:
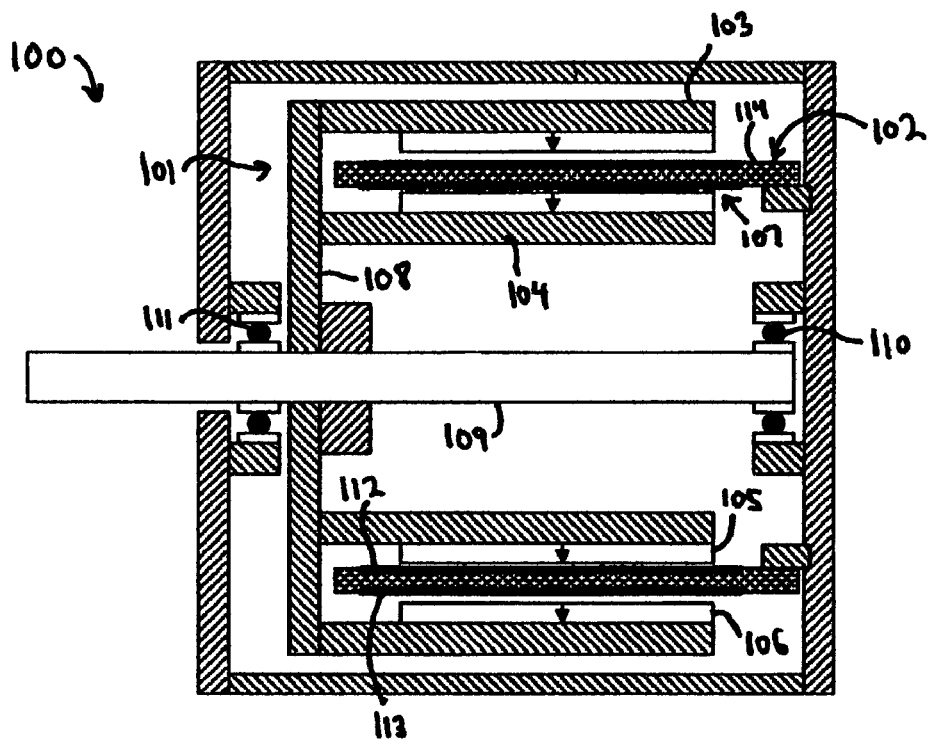
FIG. 4 is a schematic drawing of a second alternate configuration brushless motor in accordance with the invention.

A second alternate configuration brushless motor in accordance with the invention is shown in FIG. 4. The motor 100 is comprised of a rotor 101 and a stator 102. The rotor is constructed of two steel tubes 103, 104 for a radial gap design. Axial gap designs could also be constructed and would instead utilize two steel plates that are axially separated. On the steel tubes 103, 104 are radially magnetized magnets 105, 106 that have alternating polarities about the circumference and hence drive magnetic flux back and forth across the armature airgap 107. Located in the armature airgap 107 is an air core armature 114 with windings that are comprised of bundled multiple individually insulated strand conductor wire. The strands could be round, as in Litz wire, or could be rectangular or ribbon wire. The insulation between strands in the wire precludes development of significant eddy current losses in the actual winding wire from the rotating circumferentially varying flux passing through them from the rotor 101. The air core armature 114 contains the windings in a substantially non-magnetic structure to prevent losses.

The steel tubes 103, 104 are supported by a hub plate 108 that is connected to a central shaft 109. The shaft 109 rotates in bearings 110, 111. To reduce the inverter ripple induced losses in the rotor, shields 112, 113 are located in the armature airgap 107. In this configuration, the shields 112, 113 are attached to the surfaces of the air core armature 114 and are stationary. In the stationary shield configuration, some eddy current losses will be incurred in the shield from the synchronous flux changes resulting from rotor rotation. However, the synchronous motor frequency is many times lower than the pulse ripple frequency, for example 240 Hz versus 20,000 Hz. As a result, a shield with thickness designed for the high frequency losses will be thin enough to preclude significant eddy current losses from the synchronous rotor frequency.

Obviously, numerous modifications and variations of the described preferred embodiment are possible and will occur to those skilled in the art in light of this disclosure of the invention. For example, the motors disclosed herein could be used in motor-generators, such as flywheel energy storage system motor-generators, as well as commercial motors. Accordingly, I intend that these modifications and variations, and the equivalents thereof, be included within the spirit and scope of the invention as defined in the following claims, wherein

I claim:

1. A brushless permanent magnet motor for converting between electrical and mechanical energy comprising:
   a rotor that rotates about an axis of rotation and a stator that is stationary and magnetically exerts torque upon said rotor;
   said rotor comprising a ferromagnetic backiron and a circumferential array of alternating polarity magnetic poles that drives magnetic flux back and forth across an armature airgap;
   said stator comprising an air core armature with windings comprised of bundled multiple individually insulated strand conductor wire, said windings are assembled together in a substantially non-ferromagnetic structure that is located in said armature airgap and are energized by an inverter, such that when said windings are electrically energized, alternating magnetic flux from said alternating polarity magnetic poles passes through said windings as said rotor rotates and a torque is exerted on said rotor;
   said motor further comprising a thin non-ferromagnetic and electrically conducting shield located inside said armature airgap adjacent to said air core armature surface that reduces the eddy current losses incurred in said rotor from a ripple current in said windings.

2. A brushless permanent magnet motor as described in claim 1, wherein said shield is stationary and is attached to said air core armature.

3. A brushless permanent magnet motor as described in claim 1 wherein said shield is attached to said rotor on the surface of said magnetic poles and rotates with said rotor.

4. A brushless permanent magnet motor as described in claim 1, wherein:
   said shield has a thickness that is between ⅓ and three times the skin depth thickness for the shield material and said ripple current frequency.

5. A brushless permanent magnet motor as described in claim 1, wherein said shield is located adjacent to both sides of said air core armature.

6. A brushless permanent magnet motor as described in claim 1, wherein said armature airgap is radial and said shield consists of a rolled sheet of metal.

7. A brushless permanent magnet motor for converting between electrical and mechanical energy comprising:
   a rotor that rotates about an axis of rotation, and a stator that is stationary and magnetically exerts torque upon said rotor;
   said rotor having two spaced apart ferromagnetic rotor portions defining an armature airgap therebetween, and also having a circumferential array of alternating polarity magnetic poles that drives magnetic flux back and forth across said armature airgap;
   said stator comprising an air core armature with windings that are assembled together in a substantially non-ferromagnetic structure that is located in said armature airgap, whereby alternating magnetic flux from said alternating polarity magnetic poles passes through said windings as said rotor rotates;
   said motor further comprising a thin non-ferromagnetic and electrically conducting shield located inside said armature airgap that reduces the magnetically induced losses incurred in said rotor from ripple current frequency when coupled to an electronic variable speed drive.

8. A brushless permanent magnet motor as described in claim 7, wherein said shield is stationary and is attached to said air core armature.

9. A brushless permanent magnet motor as described in claim 7, wherein said shield rotates and is attached to said rotor on the surface of said magnetic poles.

10. A brushless permanent magnet motor as described in claim 7, wherein said shield has a thickness that is between ⅓ and three times the skin depth thickness for the shield material and said ripple current frequency.

11. A brushless permanent magnet motor as described in claim 7, wherein said shield is located adjacent to both sides of said air core armature.

12. A brushless permanent magnet motor as described in claim 7, wherein said armature airgap is radial and said shield consists of a rolled sheet of metal.

13. A brushless permanent magnet motor as described in claim 7, wherein said windings are driven by a pulse modulated synchronous inverter with a ripple current having a frequency that is greater than 5 kHz.

14. A brushless permanent magnet motor for converting between electrical and mechanical energy comprising:
   a rotor that rotates about an axis of rotation, and a stator that is stationary and magnetically exerts torque upon said rotor;

said rotor comprising a ferromagnetic backiron and a circumferential array of alternating polarity magnetic poles that drives magnetic flux back and forth across an armature airgap;

said stator comprising an air core armature with windings that are assembled together in a substantially non-ferromagnetic structure that is located in said armature airgap, whereby alternating magnetic flux from said alternating polarity magnetic poles passes through said windings as said rotor rotates;

said motor further comprising a thin electrically conducting shield located inside said armature airgap adjacent to said air core armature surface that reduces eddy current losses in the surfaces of the rotor magnets from ripple current frequencies, thereby increasing efficiency of said motor.

15. A brushless permanent magnet motor as described in claim 14, wherein said shield is stationary and is attached to said air core armature.

16. A brushless permanent magnet motor as described in claim 14, wherein said shield rotates and is attached to said rotor on the surface of said magnetic pores.

17. A brushless permanent magnet motor as described in claim 14, wherein said shield has a thickness that is between $1/3$ and three times the skin depth thickness for the shield material and said ripple current frequency.

18. A brushless permanent magnet motor as described in claim 14, wherein said shield is located adjacent to both sides of said air core armature.

19. A brushless permanent magnet motor as described in claim 14, wherein said armature airgap is radial and said shield consists of a rolled sheet of metal.

20. A brushless permanent magnet motor as described in claim 14, wherein:

said windings are driven by a pulse modulated synchronous inverter with a ripple current having a frequency that is greater than 5 kHz.

* * * * *